No. 736,078. PATENTED AUG. 11, 1903.
H. T. DURANT.
APPARATUS FOR THE TREATMENT OF ORES WITH SOLVENTS.
APPLICATION FILED DEC. 10, 1902.
NO MODEL.
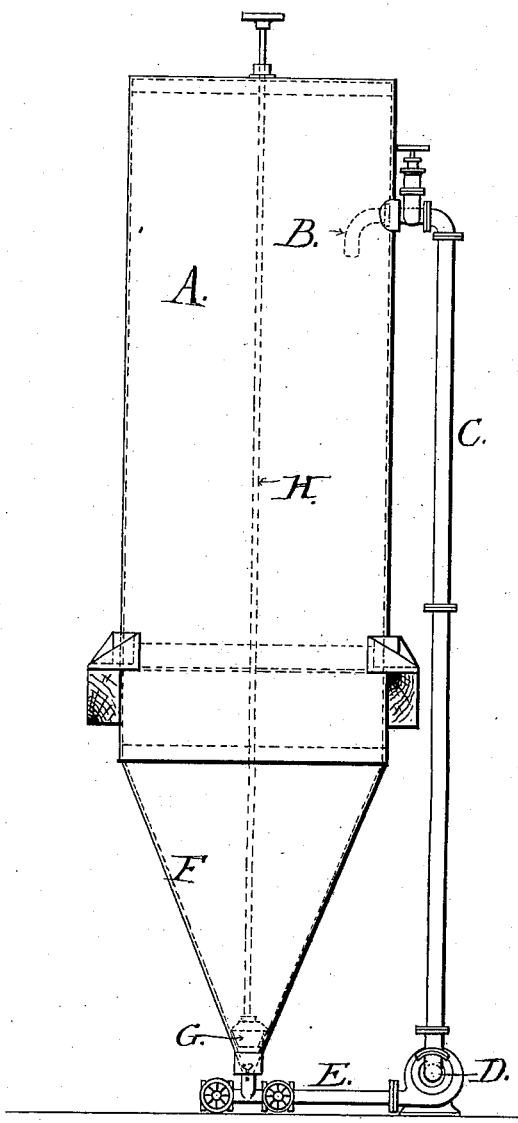
Witnesses
C. W. Fowler
G. L. Hurle
Inventor
Henry T. Durant
by Dewey, Strong & Co
his Attorneys No. 736,078. Patented August 11, 1903.

UNITED STATES PATENT OFFICE.

HENRY THOMAS DURANT, OF LONDON, ENGLAND.

APPARATUS FOR THE TREATMENT OF ORES WITH SOLVENTS.

SPECIFICATION forming part of Letters Patent No. 736,078, dated August 11, 1903.

Application filed December 10, 1902. Serial No. 134,728. (No model.)

*To all whom it may concern:*

Be it known that I, HENRY THOMAS DURANT, a citizen of England, residing in London, England, have invented an Improvement in Apparatus for the Treatment of Ores with Solvents; and I hereby declare the following to be a full, clear, and exact description of the same.

My invention relates to an apparatus for the treatment of ores or tailings with such solvents as may be suitable for the particular ore in the course of treatment.

It consists of a peculiarly-constructed tank and means for circulating the solution through the tailings or like contents of the said tank.

My invention also comprises details of construction, which will be more fully explained by reference to the accompanying drawing.

It is the object of my invention to provide an apparatus for the treatment of various ores, tailings, or the like by the use of solvents which are suitable for the particular character of the ore under treatment and by the use of which solvents the gold and silver or other metals may be extracted. Various solvents may be used. Cyanid of potassium is one well-known solvent used in the treatment of many kinds of ore.

As shown in the present case, the pulp, tailings, or other pulverized material to be treated is delivered into the tank in suitable charges with the necessary solution. The tank A may have any suitable or desired capacity and has a conical convergent bottom F and a plug G of the same angle as the cone, with connecting-rod H suitably fixed in order when raised suitably to direct the flow of the material up the sides of the cone or when lowered entirely to close the pump-delivery E. Connected with the apex of this cone is a pump or forcing mechanism D of any suitable or desired description. The suction to the pump consists of a pipe C, the upper end of which opens into the upper part of the tank A, and it has an elbow-pipe B, connected with it by a suitable swiveled joint, which allows the mouth of the pipe to be turned so as to draw from any point within the radius of its swing from the top to the bottom of the circle of which it forms a radius. Thus the material in the tank A may be drawn in through this pipe by the action of the pump D and discharged again into the apex of the cone by the delivery-pipe E, thus continually agitating the material within the tank A and subjecting it to the action of the solution, which is thus circulated through it.

Having thus described my invention, what I claim, and desire to secure by Letters Patent, is—

A device, for the treatment of ore, tailings, or other material by solvents, consisting of a tank having a conical bottom, a plug in said bottom and made conical to correspond to the angular walls thereof, a pump or forcing device discharging into the apex of the cone, and a return connection between the upper part of the tank and the suction of the pipe.

In witness whereof I have hereunto set my hand.

HENRY THOMAS DURANT.

Witnesses:
 H. E. CHESTER,
 W. J. POTTER.